Figure 1:
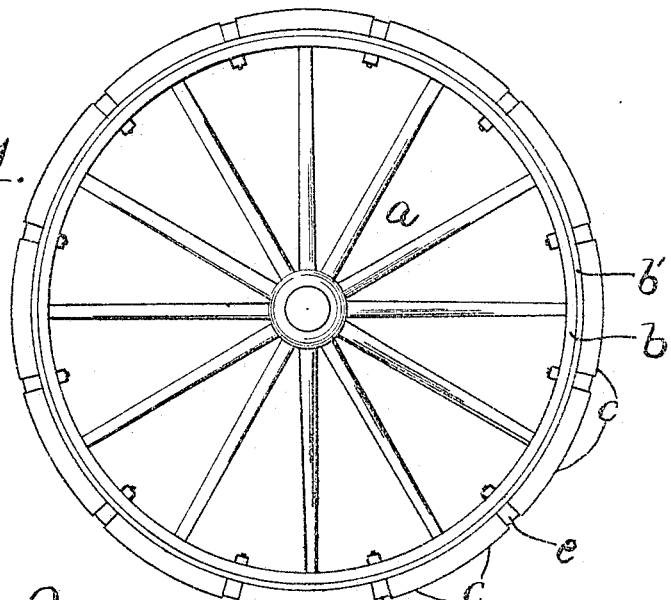

No. 775,361. PATENTED NOV. 22, 1904.
J. F. BYERS.
RUBBER TIRE.
APPLICATION FILED FEB. 11, 1904.
NO MODEL.

WITNESSES:
Daniel E. Daly
Victor C. Lynch

INVENTOR
John F. Byers
BY
Lynch & Dorr
his ATTORNEYS.

No. 775,361. Patented November 22, 1904.

UNITED STATES PATENT OFFICE.

JOHN F. BYERS, OF RAVENNA, OHIO.

RUBBER TIRE.

SPECIFICATION forming part of Letters Patent No. 775,361, dated November 22, 1904.

Application filed February 11, 1904. Serial No. 193,085. (No model.)

*To all whom it may concern:*

Be it known that I, JOHN F. BYERS, a citizen of the United States of America, residing at Ravenna, in the county of Portage and State of Ohio, have invented certain new and useful Improvements in Rubber Tires; and I hereby declare the following to be a full, clear, and exact description of the invention, such as will enable others skilled in the art to which it pertains to make and use the same.

This invention relates to improvements in rubber tires.

The object of this invention is to provide a rubber tire for wheels of vehicles which can be firmly secured to the wheel and which will have such an arrangement of parts that the portions of the tire which become injured or worn can be replaced without removing the whole tire.

My invention therefore consists in providing a tire of this description consisting of a plurality of independent sections removably secured to the felly of the wheel, so that any one of them can be taken off and replaced with a new one without disturbing the rest of the tire.

My invention further consists in the features of construction and combination of parts as described in the specification, pointed out in the claims, and illustrated in the drawings.

Figure 2:
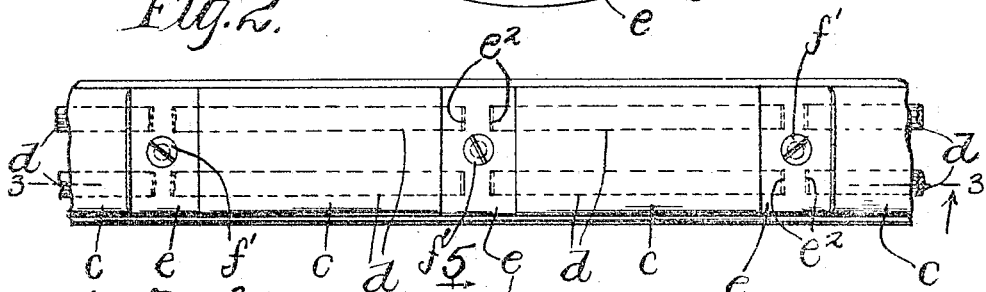
Figure 3:
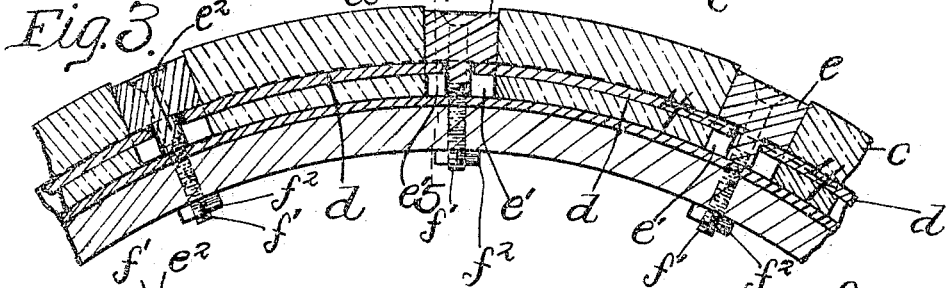
Figures 4, 5:
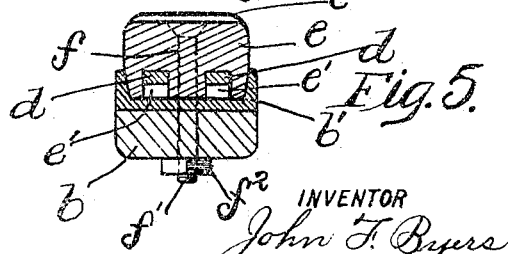

In the accompanying drawings, Figure 1 shows a wheel equipped with my improved tire. Fig. 2 is an enlarged detail view of a section of the felly. Fig. 3 is a section on line 3 3, Fig. 2. Fig. 4 is a section on line 4 4, Fig. 3. Fig. 5 is a section on line 5 5, Fig. 3.

Again referring to the drawings, $a$ represents a wheel of the usual construction. The felly $b$ is provided with a metallic grooved rim $b'$.

$c$ represents the sections which form the tire. The tire-sections $c$ preferably consist of blocks of rubber, which are arranged around the felly and are preferably spaced a short distance apart. In each section $c$ are arranged two strips or bars of steel $d$, which project a short distance at both ends thereof. Between the ends of adjacent sections $c$ are arranged clamping devices, each of which consists of a small block $e$, preferably of metal or wood. In each block $e$ are formed two grooves $e'$, arranged to receive the ends of the steel strips $d$. In each of the grooves $e'$ is arranged a central wall $e^2$. These walls $e^2$ form abutments for the ends of the bars and prevent them creeping or shifting endwise in the rubber tire-sections $c$, which would, if not prevented, result in the said strips withdrawing entirely from the clamping-block $e$ at one or the other end of the rubber tire-sections $c$. In each block $e$ is formed a bolt-hole $f$, through which is passed a bolt $f'$, which also passes through the felly and is secured by means of a nut $f^2$. The grooves $e'$ in the blocks $e$ are made not quite as deep as the thickness of the rubber between the strips $d$ and the perimeter of the felly, so that when the blocks $e$ are tightly clamped to the felly the rubber between the strips $d$ and the felly will be compressed, causing the rubber tire-sections $c$ to grip tightly on the perimeter of the wheel.

As is well known, rubber tires do not wear evenly, and often either through injury or some flaw in the rubber one portion of a tire will be rendered worthless, while the balance of the tire is in good condition; but it necessitates the abandonment of the whole tire. When this occurs in a tire of my construction, it is only necessary to remove the clamping devices at each end of the worn portion and substitute a new rubber tire-section therefor.

What I claim is—

1. The combination with the felly of a wheel of a plurality of tire-sections arranged around said felly so as to leave a space between each tire-section, a metallic core arranged in each tire-section and extending longitudinally of said section and projecting at each end thereof and means for clamping the projecting ends of said cores to the felly.

2. The combination with the felly of a wheel of a plurality of tire-sections arranged around said felly so as to leave a space between said tire-sections, a metallic core arranged in each tire-section and extending longitudinally of said section and projecting at each end thereof, clamping devices arranged to fill the spaces between the tire-sections and to engage the projecting ends of the cores and means for securing said clamping devices to the felly.

3. The combination with the felly of a wheel of a plurality of tire-sections arranged around said felly so as to leave a space between each tire-section, a metallic core arranged in each tire-section and extending longitudinally of said section and projecting at each end thereof and means arranged between the tire-sections for filling the spaces between the tire-sections and for clamping and preventing the longitudinal movement of the cores.

4. An elastic tire comprising a plurality of tire-sections, two metallic strips arranged in each tire-section and extending longitudinally through said tire-section and projecting at both ends thereof and means for clamping the projecting ends of said strips to the felly, comprising a block provided with grooves arranged to receive the ends of said strips, bolts for securing said blocks to the felly and means for preventing the lengthwise shifting of said strips in said tire-sections.

5. An elastic tire comprising a plurality of tire-sections, two metallic strips arranged in each tire-section and extending longitudinally therethrough and projecting at both ends thereof and means for clamping the projecting ends of said strips to the felly comprising a block provided with grooves arranged to receive the ends of said strips, walls arranged in the respective grooves to form abutments for the said metallic strips and prevent them from shifting endwise in said tire-sections, and bolts passing through said blocks and the felly of the wheel, substantially as described and for the purpose set forth.

In testimony whereof I sign the foregoing specification in the presence of two witnesses.

JOHN F. BYERS.

Witnesses:
VICTOR C. LYNCH,
G. M. HAYES.